No. 738,912. Patented September 15, 1903.

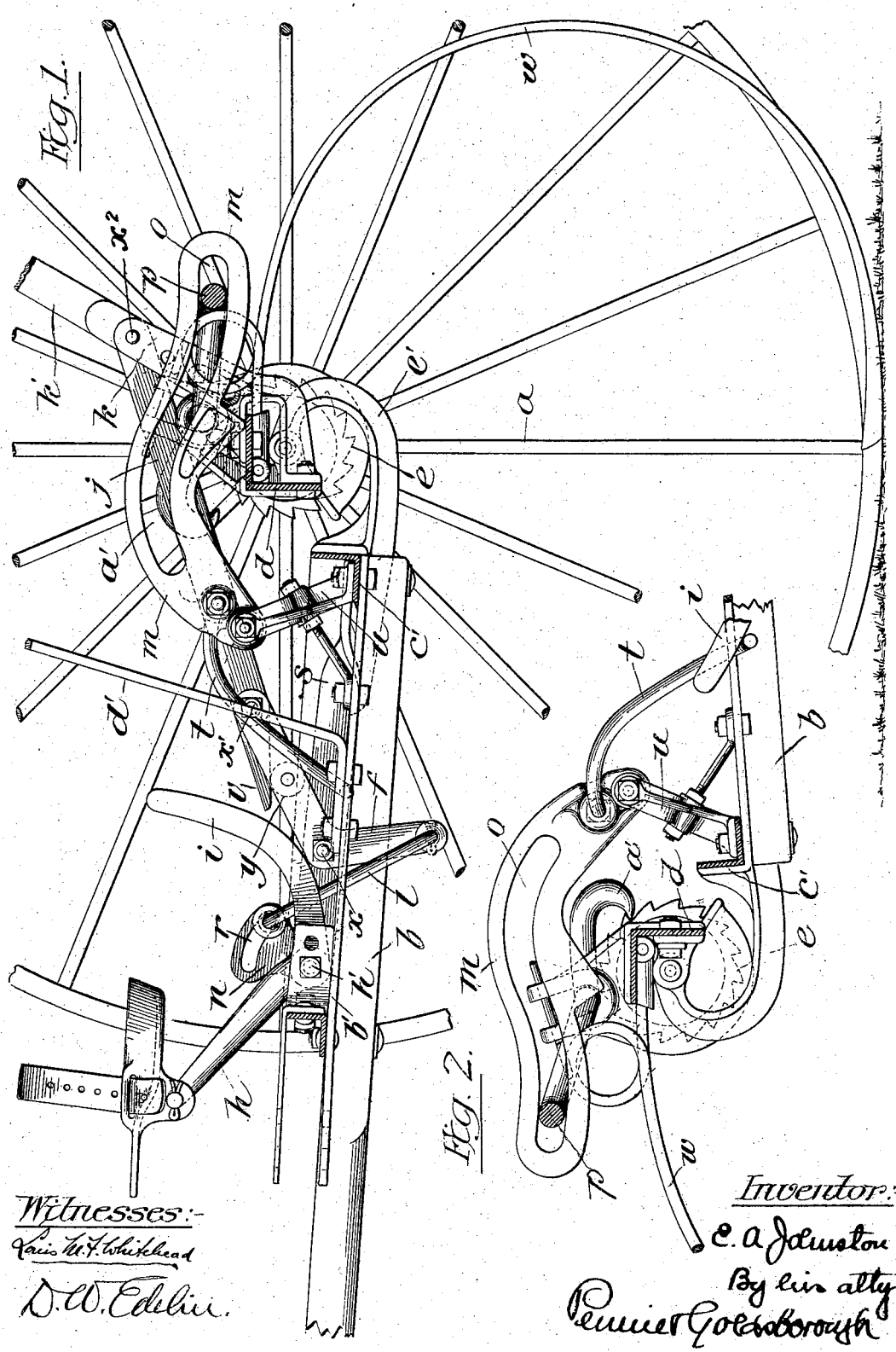

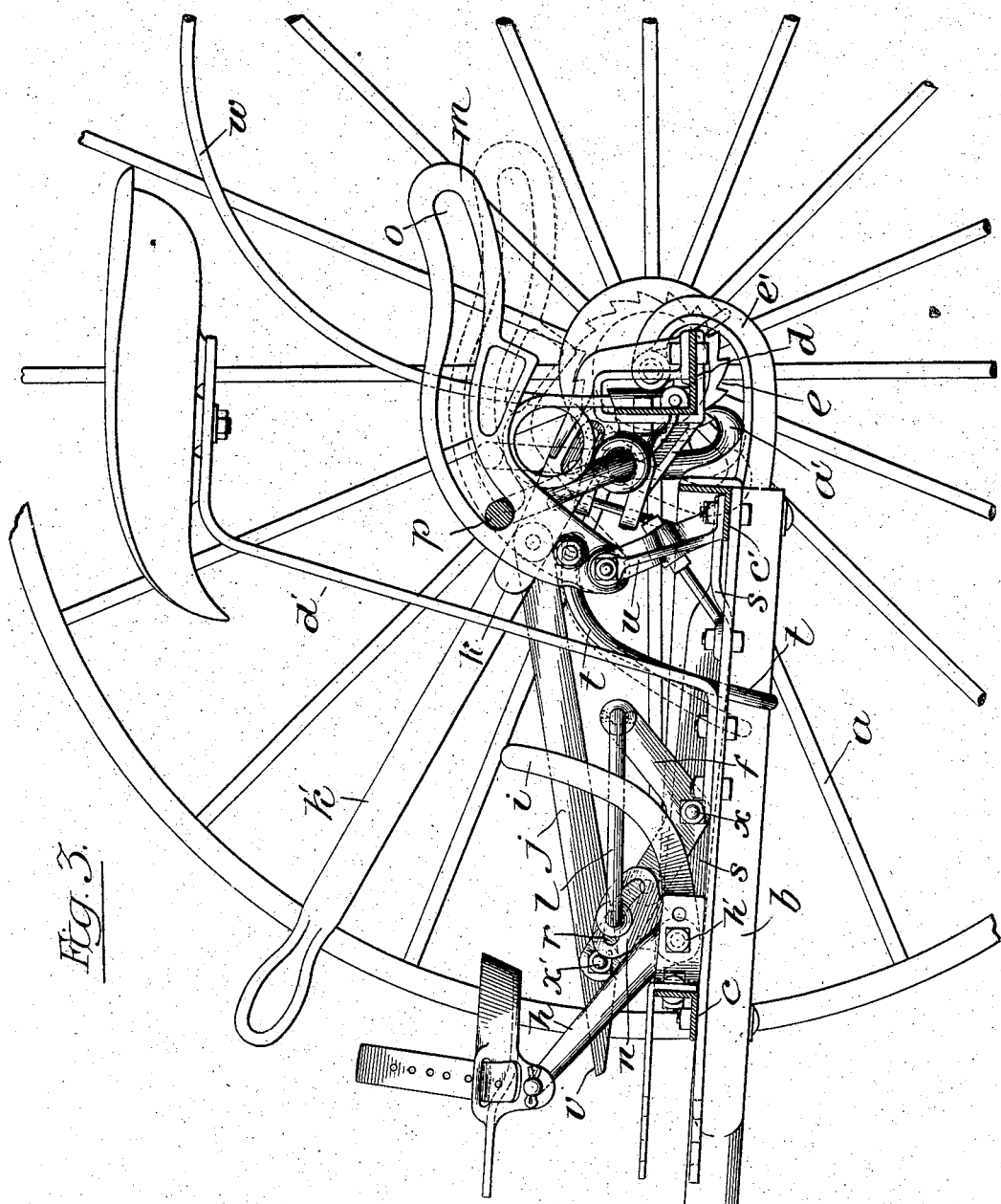

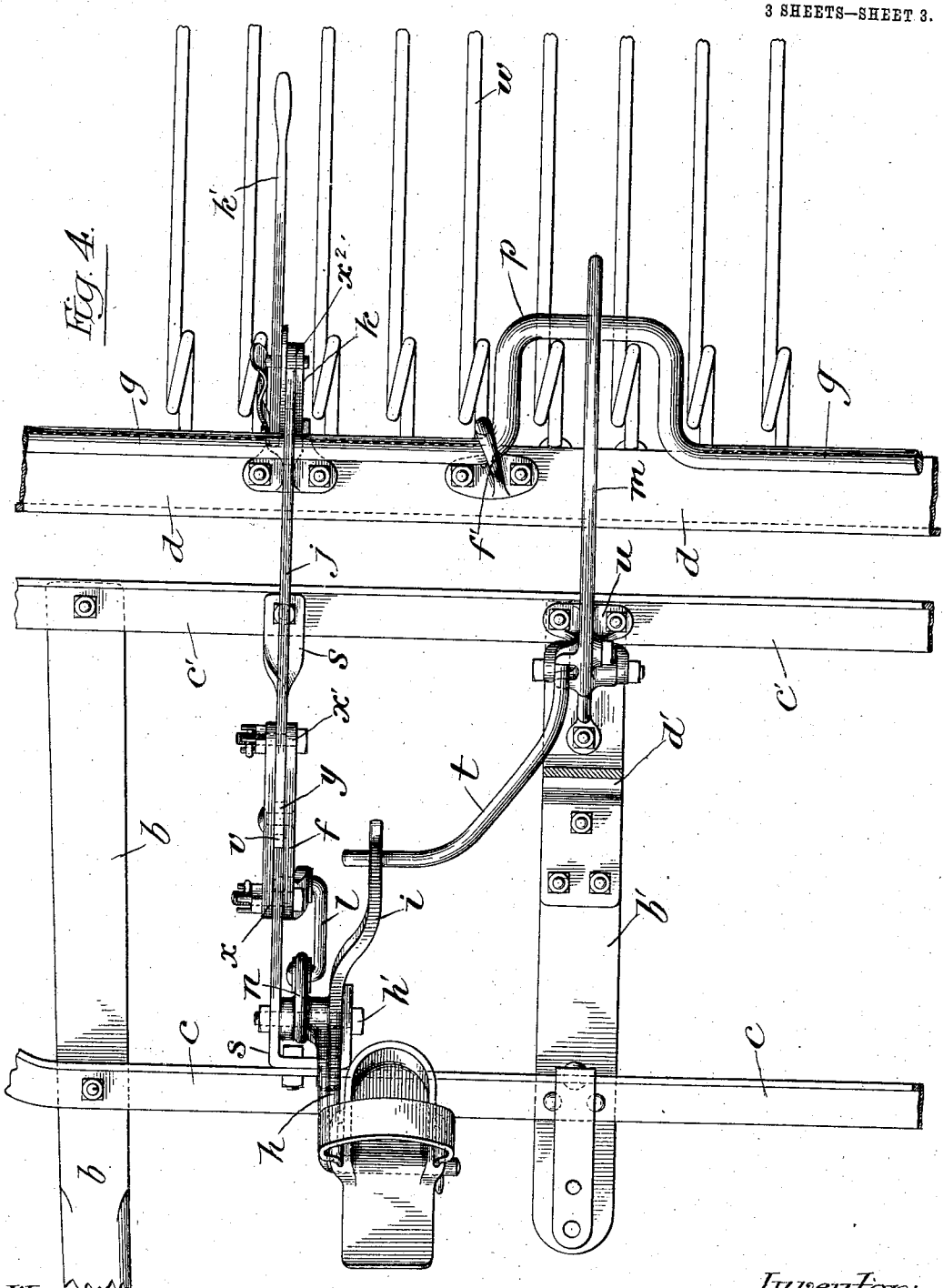

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

FOOT-TRIP FOR HORSE HAY-RAKES.

SPECIFICATION forming part of Letters Patent No. 738,912, dated September 15, 1903.

Application filed October 9, 1902. Serial No. 126,438. (No model.)

*To all whom it may concern:*

Be it known that I, EDWARD A. JOHNSTON, a citizen of the United States, residing at Chicago, Cook county, State of Illinois, have invented certain new and useful Improvements in Foot-Trips for Horse Hay-Rakes; and I do hereby declare the following to be a full, clear, and exact description of the invention, such as will enable others skilled in the art to which it appertains to make and use the same.

The invention relates to what are known as "draft-dumping" horse hay-rakes—that is to say, horse-rakes where a momentary connection is made between the rake-head and the wheels when it is desired to dump the load, so that the forward revolution of the wheels is utilized to effect a partial revolution of the head sufficient to raise the teeth and discharge the accumulated hay. In this class of rakes the connection between the tooth-head and the wheels is made through the intermediacy of a rock-shaft that is carried by the head and at its outer end has or controls certain pawls that are positioned and adapted to engage ratchets on the hubs of the wheels. These ratchets revolve constantly with the wheels; but the pawls are only intended to engage them when it is desired to dump the load, at which time their operating-shaft is rocked to effect the necessary engagement. The teeth then rise automatically, and when sufficiently elevated to discharge the load the pawls are automatically tripped out of engagement with the ratchets and the rake-head rocks back to its normal position with the teeth resting on the ground.

The invention consists in novel means for operating the shaft by means of which the pawls are thrown into and out of engagement with their ratchets, and the main characteristic of these means is that the pawl-actuating shaft is operated to throw the pawls into action by the foot-lever which is provided for holding the teeth down in raking position. Thus I arrange the same lever to effect this double duty, and I believe it to be entirely new to do this by any means and do not therefore desire or intend to be limited to the particular means herein illustrated and described.

The invention is illustrated in the accompanying drawings, wherein—

Figure 1 is a central section of the rake with the teeth in raking position. Fig. 2 is a detail of the trip-lever and its connection with the pawl-operating shaft. Fig. 3 is a section similar to Fig. 1, except that the rake-teeth are elevated as in the act of dumping the load; and Fig. 4 is a plan view of so much of the rake as involves the present invention.

Referring to these views, $a$ denotes the right-hand wheel of the rake; $b$, the thill on the same side of the machine; $c$ and $c'$, transverse frame bars or sills, and $d$ the rake-head.

As clearly illustrated in the drawings, the head is made of angle-iron. It may, however, be formed in any other way, as the invention does not pertain to the construction of this head. As is well understood in this class of machines, this head really forms the axle of the machine, and at its opposite ends it is provided with stub-axles on which the wheels are journaled and which axles are connected to the rake-frame by brackets $e'$. The seat-support $d'$ is located about centrally of the rake and is bolted to a fore-and-aft bar $b'$, which is secured between the transverse frame-bars $c\ c'$. A little to the right of the driver's seat a bar $s$ is also secured at its opposite ends between the transverse frame-bars $c\ c'$. This bar $s$ forms the pivotal support for the dumping-lever and its connections, as will be more fully described later on.

The rake-head is provided, as usual, with a pawl-operating shaft $g$, which rocks in bearings on the head, of which the middle bearing $f'$ is shown in the drawings. At its opposite ends this shaft carries or controls pawls $a'$, which are located and arranged so as to engage the teeth of circular ratchets $e$, that are secured to revolve with the wheels. The pawl-operating shaft $g$ is provided about centrally of its length with a cranked portion $p$, and a trip-lever for operating the shaft is pivoted at its forward end to a bracket $u$ on the rake-frame. The trip-lever $m$ is slotted, as shown at o, and the cranked portion p of the pawl-operating shaft passes through this slot, so that when the trip-lever is tilted on its pivot it will rock the shaft g and cause the pawls a' to engage with the ratchets e, and so, also, that the shaft may move bodily when the rake-teeth are elevated without disengaging the pawls from the ratchets until the proper time. A little to the right of the cranked portion of the shaft g the rake-head is provided with an upstanding bracket k and is also usually furnished with a hand-lever k', which is conveniently made as an extension of the bracket. A link j is pivotally connected to the upper end of the bracket k and at its forward end has a similar connection with one of the arms of a bell-crank lever f, which is pivoted on a horizontal pivot x in the fore-and-aft bar s, already described. The bell-crank lever is conveniently formed of two leaves, one of which lies on each side of the bar s and whose rear ends also embrace the front end of the link j. Between these bars of the bell-crank at a point between its rear end and the pivot x the lever is provided with a roller y, with which the front end v of the link j is adapted to contact when the teeth of the rake are down in operative position, and the pivots x, x', and $x^2$ of the link and bell-crank lever, just described, are nearly in line with one another, so as to form a toggle-lock to hold the head with the teeth in their lowered position.

A foot-lever h is pivoted at h' to the front end of the fore-and-aft bar s. It has the usual foot-piece and strap on its front end and is provided with an arm or projection i, extending rearwardly from its pivot at an angle to the front part of the lever, as best shown in Figs. 1 and 3. It is connected with the rake-head through the intermediacy of the bell-crank f and link j, already described, by means of a link l, which is pivotally connected at one end to the front arm of the bell-crank f and has its opposite end connected to a segment n, projecting from the hub of the lever, by means of a slot r in the segment, in which the end of the link is adapted to slide to and fro. The function of this lever is to hold the rake-teeth down in working position and also to operate the trip-lever, hereinafter described, for the purpose of dumping the rake.

As shown in all the figures of the drawings, the trip-lever m is provided with a forwardly-extending arm or projection t. This arm extends, as best shown in Fig. 4, laterally into the path of movement of the arm i of the holding-lever h, so that the trip-lever may be operated by such movement of the lever h as will depress the arm i and cause it to tilt the trip-lever on its pivot.

The working position of the parts is illustrated in Fig. 1. The trip-lever m normally holds the rock-shaft g in such position that the dumping-pawls are held out of engagement with the ratchets e. The foot-lever is also held forwardly at this time, and by a slight upward pressure on the lower end of the bell-crank f the link j is straightened out until the pivotal points x, x', and $x^2$ are nearly in line with one another and the rake-head is held in such position that the teeth are kept down to their work.

When it is desired to dump the accumulated hay, the pressure on the holding-lever is released and the driver moves the lever over to the rear. This causes the arm i to strike the projection t of the trip-lever m, and the pawl-operating shaft is rocked so that the dumping-pawls a' may engage the ratchets e. The rake-head then begins to revolve with the wheels, and the cranked portion p of the pawl-operating shaft moves along the slot o, the trip-lever being at this time held raised by the driver keeping the holding-lever in such position that the arm i holds the projection t down, thereby preventing the trip-lever from accidentally causing a premature release of the dumping-pawls from the ratchets e.

In order to permit the holding-lever to be held in the position just described while the rake-head makes the partial rotation necessary to dump the load, it is of course necessary that the connection between the lever and the head should be such that the bracket k may move forwardly independently of the lever. This is permitted by the sliding connection already described between the front end of the link l and the segment n on the hub of the lever.

The construction being as thus described and the operation having already been explained, it only remains to be stated that when the teeth are in raking position the front end of the link l is at the rear end of the slot i in the holding-lever segment n. At this time the slight pressure of the driver's foot on the lever pulls upwardly on the link and depresses the rear arm of the bell-crank lever f until the nose v of the link j is hard down on the roller y. At this time there is a rigid connection between the holding-lever and the rake-head, and the latter is held positively with the teeth in raking position.

When the rake-head is released, as already described, the slot r permits the backward movement of the holding-lever necessary to cause the rearwardly-projecting arm i to engage the forward projection from the trip-lever. The rake-head then immediately starts to rotate forward, and the centers of the lever h and the bell-crank lever f and the arms of the latter and the segment n are so arranged and proportioned that there is comparatively little movement of the link l during the dumping operation of the rake. This movement is permitted by the slot r in the lever-segment, and when the head reaches a position sufficiently elevated to permit of the clean dumping of the load the forward end of the link l comes up against the front end of the slot r. This throws the holding-lever forward into its normal position and disengages the projection $i$ from the extension $t$ of the trip-lever, which latter is thereupon free to permit the disengagement of the dumping-pawls. At this time the cranked portion $p$ of the rock-shaft $g$ strikes the front end of the slot in the trip-lever, and the pawls $a'$ are disengaged from the ratchets. The rake head and teeth thereupon return to their normal position and the link $j$ and bell-crank again straighten out, so that the holding-lever holds the teeth in raking position.

Having thus described my invention, what I claim, and desire to secure by Letters Patent, is—

1. In a wheeled hay-rake, the combination with the rake-head, the lever for holding the rake-teeth down, the pawls and ratchets, their operating-shaft, and the trip-lever, of a connection between the holding-lever and the trip-lever whereby the latter may be operated to throw the pawls into action by means of said holding-lever.

2. In a wheeled hay-rake, the combination with the rake-head, and the lever for holding the rake-teeth down, of connections between the head and lever whereby the teeth may be held down in raking position and the head after starting is permitted to rotate forwardly independently of the lever.

3. In a wheeled hay-rake, the combination with the rake-head, and the lever for holding the rake-teeth down, of a second lever pivoted on the rake-frame and connected with the head, and a connection between said second lever and the holding-lever whereby the former may move when the rake is dumping independently of the latter.

4. In a wheeled hay-rake, the combination with the rake-head, and the lever for holding the rake-teeth down, of a bell-crank pivoted on the rake-frame and connected to the rake-head by one of its arms so as to move with the head, and a connection between the bell-crank and the holding-lever whereby the former may move when the rake is dumping without moving the latter.

5. In a wheeled hay-rake, the combination with the rake-head, the lever for holding the rake-teeth down, the pawls and ratchets, their operating-shaft, and the trip-lever, of a forward projection from the trip-lever, and a rearward projection from the holding-lever, one of said projections extending into the path of movement of the other, whereby when the holding-lever is moved in the direction to release the head, the trip-lever will be operated to throw the pawls into action.

6. In a wheeled hay-rake, the combination with the rake-head, the lever for holding the rake-teeth down, the pawls and ratchets, their operating-shaft, and the trip-lever, of connections between the head and the holding-lever whereby the teeth are held down to work, and a connection between the holding-lever and the trip-lever, the connections between the holding-lever and the head and trip-lever, respectively, being such that the movement of the holding-lever in either direction will only operate one of the parts.

7. In a wheeled hay-rake, the combination with the rake-head, the lever for holding the rake-teeth down, the pawls and ratchets, their operating-shaft, and the trip-lever, of a bell-crank pivoted on the rake-frame and having a fast connection to the head by one of its arms so as always to move with the head, a loose connection between the other arm of the bell-crank and the holding-lever, a forward projection on the trip-lever, and a rearward projection on the holding-lever, one of said projections extending into the path of movement of the other, whereby when the holding-lever is actuated to release the head, it operates the trip-lever and is permitted to hold said trip-lever in a position to prevent the premature disengagement of the pawls during the dumping of the load.

In testimony whereof I affix my signature in presence of two witnesses.

EDWARD A. JOHNSTON.

Witnesses:
   CHAS. H. CHAMBERS,
   M. LOIS CATLIN.